May 21, 1957

M. C. BARTZ ET AL 2,793,327

SPEED SENSING APPARATUS

Filed April 10, 1953

INVENTORS
MELVIN C. BARTZ
BY WARNER C. WINTRODE m. a. Hobbs

ATTORNEY

United States Patent Office
2,793,327
Patented May 21, 1957

2,793,327

SPEED SENSING APPARATUS

Melvin C. Bartz and Warner C. Wintrode, South Bend, Ind., assignors to Bendix Aviation Corporation, South Bend, Ind., a corporation of Delaware Application April 10, 1953, Serial No. 347,886

11 Claims. (Cl. 317—5)

This invention relates to rotational speed sensing devices and more particularly to electronic speed sensing devices.

In the past, attempts have been made to use, as a speed sensing means, a direct current tachometer which produces a direct current voltage varying in magnitude with the speed of rotation. It has been found, however, that sensing speed on this basis is subject to considerably more error than is acceptible for highly critical applications such as fuel control devices for gas turbine engines. Accordingly, it is an object of this invention to provide an electronic speed sensing device which translates an alternating current of varying frequency into a usable direct current signal.

Another object of the invention is to provide an electronic speed sensing device which is easily adapted for use with a gas turbine fuel control which utilizes a direct current speed signal to regulate fuel flow.

A further object of the invention is to provide an electronic speed sensing device which produces a signal anticipating change in rotational speed, thus improving system stability.

It is a further object of the invention to provide a speed error signal which is highly accurate in reflecting variations from a selected speed.

A still further object of the invention is to provide a speed error signal which is instantly responsive upon the occurrence of variations from a selected speed.

Other objects and advantages will be readily apparent from the following detailed description taken in connection with the accompanying drawings, wherein.

Figure 1:
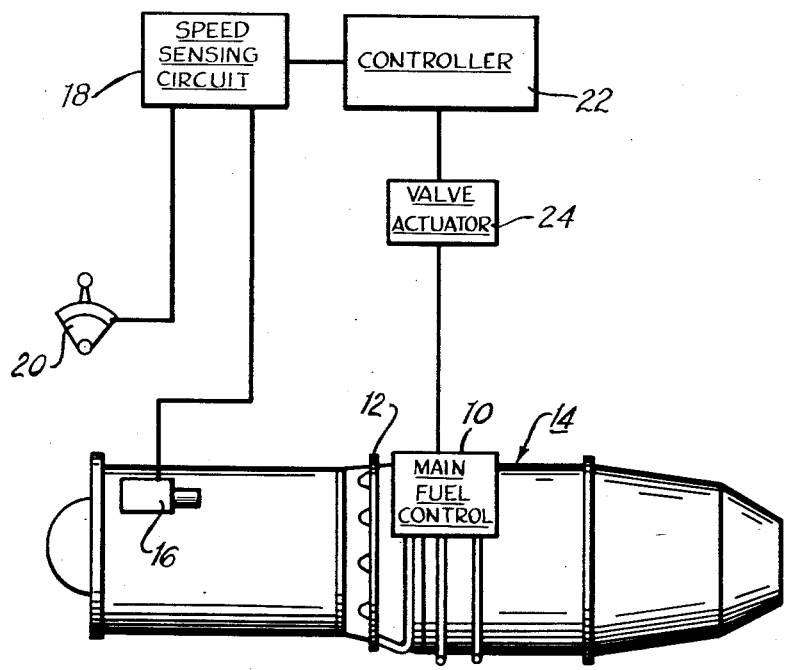
Figure 1 is a black diagram of the speed sensing device and control mechanism used in conjunction with a gas turbine engine.

With reference to Figure 1, numeral 10 designates a control device containing a fuel metering valve which controls the fuel passing from a source (not shown) to a manifold 12, of a gas turbine engine 14. An alternating current tachometer 16 is connected to the turbine in such manner that the rotational speed of the tachometer is directly proportional to that of the turbine. A signal from the tachometer feeds into the speed sensing device 18 which compares this signal with a reference signal established by the throttle 20. The speed sensing device then supplies a signal representative of variations from the reference to the controller 22, which is a device for coordinating and amplifying several control signals in such manner that a resultant signal may be utilized by a metering valve actuator 24. This valve actuator may consist of a reversible two-phase electric motor having an exciting winding and a control winding.

Figure 2:
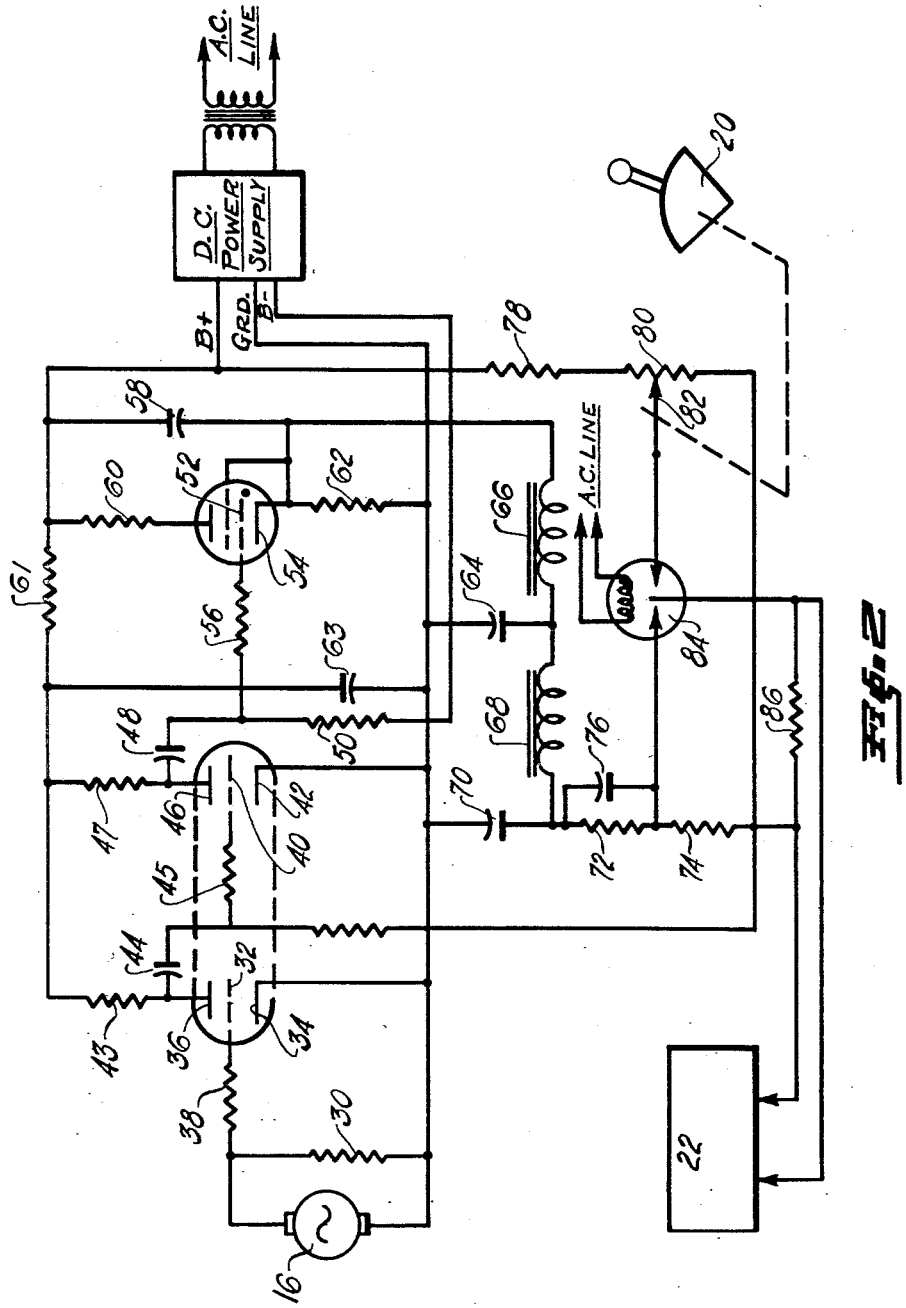
Figure 2 is a schematic wiring diagram of the speed sensing device.

In Figure 2 the tachometer 16 which is directly connected to the turbine 14, generates an alternating current voltage across resistor 30, the frequency of which is directly proportional to the rotational speed of the turbine. This alternating current signal is impressed upon grid 32 of triode 34, which is one-half of a vacuum tube containing two triodes, where it is amplified. Because triode 34 is driven alternately between saturation and cut-off, a squared and limited sine wave appears at anode 36. Grid 32 is protected from drawing excessive current during the positive half cycle by grid limiting resistor 38.

The amplified signal appearing on anode 36 is coupled to grid 40 of triode 42 through condenser 44. The action of grid limiting resistor 45 corresponds to that of resistor 38. At plate 46 of triode 42 appears a voltage of square wave form varying in frequency with turbine speed. Numerals 43 and 47 represent standard anode resistors.

Condenser 48 and resistor 50 comprise a differentiating network across which the square wave signal from plate 46 is converted to alternating positive and negative pulsations of short duration. These pulsations are coupled to grid 52 of thyratron tube 54 by grid limiting resistor 56. The action of tube 54, which can be considered a counter tube is as follows: Just prior to the arrival of a positive pulse on grid 52, the tube 54 is held cut-off by the negative grid voltage from the power supply. Condenser 58 is charged to the anode power supply potential or B plus voltage and no current is flowing through either resistance 60 or resistance 62. When the positive pulse appears on the grid 52, the negative grid bias is overcome and the tube 54 ionizes, causing condenser 58 to discharge rapidly through the tube 54 and resistor 60. The action of condenser 58 prevents the rapid decay of cathode voltage and thereby allows the grid to regain control of the tube. Condenser 58 then charges through resistor 62 to the power supply potential and the tube is once again in a quiescent state ready to accept the next positive pulse. The function of resistor 61 and capacitor 63 is to keep transient signals from the counter circuit from feeding back to triodes 34 and 42.

The average current through resistor 62 is directly proportional to the capacity of condenser 58, the power supply voltage, and the frequency of the firing pulses. Since $E=IR$, then the average voltage across resistor 62 is a function of the frequency and the power supply voltage when resistance 62 and capacitance 58 are held constant. With all circuit values except the frequency of pulsations across tube 54 held constant, the average voltage across resistor 62 becomes dependent upon the frequency of pulsations alone and hence, upon the rotational speed of the turbine 14. Inductance windings 66 and 68 and condensers 64 and 70 constitute an averaging filter, and across condenser 70 appears an average voltage proportional to turbine speed.

Resistors 72 and 74 and condenser 76 comprise an output differentiating or phase lead network such that the output across resistor 74 contains a voltage proportional to turbine speed and proportional also to the first derivative or rate of change of speed. Resistor 78 and potentiometer 80 comprise a voltage dividing network from the anode supply voltage to ground in which slider 82, actuated by throttle 20, picks off a reference signal. The two signals, one from the potentiometer 80 and one across resistor 74 are then applied to the contacts of modulator or chopper 84. This modulator then alternately compares the two outputs, one a signal proportional to actual engine speed plus rate of change of speed, and the other a reference signal as established by the throttle. The resulting pulsating direct current voltage appearing across resistor 86 is a speed error signal reflecting the magnitude and direction of the difference in turbine speed from that set on the throttle 20. This error signal is then fed to the controller which utilizes it and other signals to establish the desired turbine speed.

It will be noted by reference to Figure 2 that potentiometer 80 is fed through resistor 78 from the same power source as that which supplies the anode circuit of the counter, thyratron tube 54. Since counter output is proportional to its applied anode voltage, a change in anode voltage will be reflected both across resistor 74 and potentiometer 80. Because these two signals are compared through modulator 84, it follows that the system is self-compensating for changes in line voltage.

Operation of our speed sensing device is as follows: Assuming a condition where the engine is operating at the speed established by the throttle setting, the signal from the counter developed across resistor 74 will be equal to that from potentiometer 80. These signals will cancel and no voltage will be developed across resistor 86. Hence, there will be no speed signal to the controller. Now assume the pilot moves the throttle in a direction corresponding to a request for increased speed. The voltage from potentiometer 80 will increase, thus developing a pulsating direct current voltage across resistor 86. This signal is used by the controller to open the fuel valve, which causes the engine to increase speed. This change is reflected by the tachometer, which increases the frequency of its signal to the grid of triode 34. This signal is amplified through triodes 34 and 42, converted into unidirectional pulsations of the tachometer frequency by counter tube 54 and is subsequently filtered. This filtered signal appears across resistor 74 as a smooth direct current voltage of magnitude proportional to tachometer frequency. The function of condenser 76 is to reflect changes in the direct current by means of a phase shifting action which tends to anticipate the changes. Because of this action, the rate of speed increase falls off as the requested speed is approached thus providing a damping action.

Conversely, if either through a request from the pilot or through changes in external conditions, the engine is rotating faster than the signal from the throttle demands, a pulsating direct current will be developed across resistor 86 in a direction opposite to that established in the example above. The controller will utilize this signal to rotate the fuel valve in a closing direction, causing engine speed and hence, tachometer output frequency, to decrease. This change will be reflected through the amplifier and counter as outlined above.

While this speed sensing device is shown in conjunction with a gas turbine engine and related components of a fuel system therefor, it will be apparent to those skilled in the art that the invention may have many applications. And while only one embodiment of the invention is shown, it will be readily apparent that many changes or arrangements in the parts may be made without departing from the spirit of the invention.

We claim:

1. In a rotational speed sensing device consisting of means for producing an alternating current voltage varying in frequency with the rotational speed of the thing measured, means for converting said voltage to a square wave form, coupling means for converting said voltage into alternate positive and negative pulsations of short duration, electron tube means for changing said voltage into a pulsating direct current, filter means for changing said pulsating direct current into a steady direct current proportional in magnitude to the speed sensed, a differentiating circuit having a voltage output proportional to the speed and to the rate of change of the speed sensed, a throttle control consisting of a voltage dividing network producing a steady direct current reference voltage, and a modulator which creates a speed error signal by comparing the signal from said voltage dividing network with the signal from the differentiating circuit.

2. A rotational speed sensing device as in claim 1 containing also a direct current power supply arranged to supply said electron tube and said voltage dividing network from the same source.

3. In a speed sensing device for a gas turbine engine, an engine driven alternating current tachometer which produces a signal varying directly in frequency with the speed of said engine, means producing a square wave output from said signal, a resistance capacitance coupling to a control grid, an electron tube containing said control grid for converting said signal into positive pulsations of short duration, filtering means for changing said pulsating signal into a steady direct current voltage proportional to turbine speed, a differentiating network consisting of two resistances connected in series and a capacitance connected in parallel with one of said resistances for producing a voltage proportional to speed and to rate of change of speed, a voltage dividing circuit with a throttle connected thereto, a modulator which creates a speed error signal by comparing a reference voltage from said voltage dividing circuit with the voltage from said differentiating circuit, and a direct current power supply arranged to supply said electron tube and said voltage dividing network from the same source.

4. In a fuel metering system as in claim 3, a controller which utilizes said error signal to establish the turbine rotational speed.

5. In a speed sensing device for a gas turbine engine, an engine driven alternating current tachometer which produces a signal varying in frequency directly with the speed of said tachometer, means producing a square wave output from said signal, means for converting said signal into positive pulsations of short duration, filtering means for changing said pulsating signal into a steady direct current voltage proportional to turbine speed, a differentiating network consisting of two resistances in series and a capacitance connected in parallel with one of said resistances for producing a voltage proportional to speed and to rate of change of speed, a voltage dividing circuit with a throttle connected thereto, and a modulator which creates a speed error signal by comparing a reference voltage from said voltage dividing circuit with the voltage from said differentiating circuit.

6. In a speed sensing device for a gas turbine engine, an engine driven alternating current tachometer which produces a signal varying in frequency with the speed of said engine, means producing a square wave output from said signal, means for converting said signal into positive pulsations of short duration, filtering means for changing said pulsating signal into a steady direct current voltage proportional to turbine speed, a voltage dividing circuit with a throttle connected thereto, and a modulator which creates a speed error signal by comparing a reference voltage from said voltage dividing circuit with said voltage proportional to turbine speed.

7. In a speed sensing device as in claim 6, a direct current power supply arranged to supply said conversion means and said voltage dividing circuit from the same source.

8. In a fuel metering system for a gas turbine engine, an engine driven alternating current tachometer which produces a signal varying in frequency directly with the speed of said engine, means for converting said signal into positive pulsations of short duration, filtering means for changing said pulsating signal into a steady direct current voltage proportional to turbine speed, a phase lead circuit consisting of two resistors connected in series relationship and a capacitor connected in parallel with one of said resistors for producing a voltage proportional to speed and to rate of change of speed, a voltage dividing network with a throttle connected thereto, a modulator which creates a speed error signal by comparing a reference voltage from said voltage dividing circuit with the voltage from said phase lead circuit, and a controller which utilizes said error to establish the turbine rotational speed.

9. A rotational speed sensing device comprising means for producing an alternating current voltage varying in frequency with the rotational speed of the device measured, electronic means for converting said voltage into a steady direct current voltage proportional to the speed of the device measured, and a differentiation circuit for producing a combination voltage proportional to the speed and to the rate of change of speed of the device measured.

10. In an electronic speed sensing device having an alternating current tachometer, means for converting the output of said tachometer into a direct current including a thyratron tube, a charging condenser connected across said thyratron tube, a resistor in the cathode circuit of said tube across which said direct current signal appears, and a filter circuit for smoothing said direct current signal; means producing a speed reference signal; and a modulator for comparing said reference signal with the output of said filter circuit.

11. In an electronic speed sensing device having an alternating current tachometer, means for converting the output of said tachometer into a direct current including a thyratron tube, a charging condenser connected across said thyratron tube, a resistor in the cathode circuit of said tube across which said direct current signal appears, and filter means for smoothing said direct current signal; a rate circuit comprising two resistors in series across which said filtered direct current signal is impressed and a capacitor connected in parallel with one of said resistors which reflects changes in said signal as a phase shifting action which tends to anticipate said changes; means producing a direct current speed reference signal; and a modulator for comparing the output of said rate circuit with said reference signal.

References Cited in the file of this patent

UNITED STATES PATENTS

| | | |
|---|---|---|
| 2,472,396 | Schoenbaum | June 7, 1949 |
| 2,478,279 | Kochenburger | Aug. 9, 1949 |
| 2,498,281 | Kovalsky | Feb. 21, 1950 |
| 2,541,666 | Quinn | Feb. 13, 1951 |
| 2,562,792 | James | July 31, 1951 |
| 2,583,587 | Milsom | Jan. 29, 1952 |

FOREIGN PATENTS

| | | |
|---|---|---|
| 589,562 | Great Britain | June 24, 1947 |